(12) United States Patent
Hong et al.

(10) Patent No.: US 8,009,081 B2
(45) Date of Patent: Aug. 30, 2011

(54) 3D VIDEO-DOPPLER-RADAR (VIDAR) IMAGING SYSTEM

(76) Inventors: Lang Hong, Beavercreek, OH (US); Steven Hong, Beavercreek, OH (US)

( * ) Notice: Subject to any disclaimer, the term of this patent is extended or adjusted under 35 U.S.C. 154(b) by 534 days.

(21) Appl. No.: 12/255,081

(22) Filed: Oct. 21, 2008

(65) Prior Publication Data

US 2010/0097262 A1    Apr. 22, 2010

(51) Int. Cl.
*G01S 13/86* (2006.01)
(52) U.S. Cl. .............................. 342/52; 342/55; 342/59
(58) Field of Classification Search .................... 342/52, 342/54–55, 59
See application file for complete search history.

(56) References Cited

U.S. PATENT DOCUMENTS

| | | | | |
|---|---|---|---|---|
| 3,161,870 A * | 12/1964 | Pincoffs | ........................... | 342/59 |
| 3,378,835 A * | 4/1968 | Mooney, Jr et al. | ............. | 342/59 |
| 3,618,088 A * | 11/1971 | Simpson, Sr. | .................... | 342/59 |
| 4,319,242 A * | 3/1982 | Lewis | ............................. | 342/67 |
| 4,347,513 A * | 8/1982 | Schindler | ........................ | 342/13 |
| 6,362,774 B1 * | 3/2002 | Green | ............................. | 342/59 |
| 7,183,969 B2 * | 2/2007 | Pozgay et al. | ................. | 342/174 |
| 7,358,892 B2 * | 4/2008 | Thome et al. | .................. | 342/174 |
| 2005/0146458 A1 * | 7/2005 | Carmichael et al. | ............ | 342/52 |
| 2006/0132357 A1 * | 6/2006 | Pozgay et al. | ................. | 342/174 |
| 2010/0079330 A1 * | 4/2010 | Venkatachalam et al. | ...... | 342/59 |
| 2010/0097262 A1 * | 4/2010 | Hong et al. | ..................... | 342/52 |

\* cited by examiner

*Primary Examiner* — John B Sotomayor
(74) *Attorney, Agent, or Firm* — Wilson D. Swayze, Jr.

(57) ABSTRACT

A moving sensor suite for imaging a scene has three Doppler radars, two moving and one fixed, a fixed video camera and a fixed GPS receiver. The Doppler radars measure the relative velocities between the radars and the scene, as well as the scene's electromagnetic reflectivity, while the video camera records the motion of the camera and the optical property of the scene. The correct registration of the Doppler radars and the camera is established by finding the intersections of the moving Doppler radar motion vectors with the image plane of the video camera. The scene features in the first frame are determined by Doppler circle intersections. The correspondences of the features in the next two frames are established by a feature matching operation.

18 Claims, 7 Drawing Sheets

3D VIDEO-DOPPLER-RADAR (VIDAR) IMAGING SYSTEM

TECHNICAL FIELD

The invention relates to a 3D video-Doppler-radar (VIDAR) imaging system.

BACKGROUND OF THE INVENTION

Traditionally, a Doppler radar only measures a relative velocity at line-of-sight (LOS). In FIG. 3, the relative velocity of a stationary scene point is calculated in terms of Doppler frequency by $$f_D = K v_r \cos(\theta_r), \quad (1)$$

the relative velocity of an approaching moving object is calculated as (FIG. 4)

$$f_D = K[v_r \cos(\theta_r) + v_t \cos(\phi_t)] \quad (2)$$

and the relative velocity of a leaving moving object is (FIG. 5)

$$f_D = K[v_r \cos(\theta_r) - v_t \cos(\theta_t)] \quad (3)$$

where K is a Doppler frequency conversion constant. No range and other 3D structure information is available from single Doppler radar.

There are a number of methods of deriving 3D structure information from either a single image or a sequence (or sequences) of images, collectively called the "structure from X methods". These methods include: structure from texture, structure from shadow, structure from motion, structure from stereo, structure from focusing/defocusing, etc. However, none of these methods can reliably provide 3D information without strict conditions.

Since a Doppler radar and a camera measure different properties of a 3D scene, fusion of radar and camera signals is desired to obtain reliable information about the scene. Correct registration of a Doppler radar with a camera is crucial for information fusion. So far, there is no reliable way of registering a Doppler radar and a camera, such that the measurements from the Doppler radar and camera all refer to the same physical point in the scene.

FIG. 4 illustrates the relative velocity measurement of an approaching moving object.

FIG. 5 illustrates the relative velocity measurement of a leaving moving object.

SUMMARY

An imaging system to generate an image of a scene may include a first movable radar to generate a first radar motion ray, a second movable radar to generate a second radar motion ray, a third fixed radar to generate a third radar direction ray, and a video camera to receive data from the intersection of the first radar motion ray and the second radar motion ray.

The imaging system may generate a first Doppler difference based upon the difference between the first radar signal and the third radar signal, and the imaging system may generate a second Doppler difference based upon the difference between the second radar signal and the third radar signal.

The imaging system may generate a first cone angle and a first circle based upon the first Doppler difference, and the imaging system may generate a second cone angle and a second circle based upon the second Doppler difference.

The imaging system may generate a Doppler ratio based upon the first Doppler difference and the second Doppler difference.

The imaging system may generate a feature point based upon the first and second cone angles and the first and second circles, and the first radar may be a first Doppler radar.

The second radar may be a second Doppler radar, and the third fixed radar may be a third Doppler radar.

The sensor apparatus may include a global positioning system receiver.

An imaging system adapted for registration may include a first movable radar to generate a first radar motion ray, a second movable radar to generate a second radar motion ray, a third fixed radar to generate a third radar direction ray and a video camera to define a virtual image plane. The first radar motion ray and the second radar motion ray may be registered with the virtual image plane.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

While the term "video-Doppler-radar" is used herein, it also may refer to other combinations, such as "Doppler-radar-video", "camera-Doppler-radar", Doppler-radar-camera", etc. The term "video" may refer to "any image sequences" which may be generated by electro-optical or thermal or hyper-spectral devices. The invention discussed here can be applied to the case of multiple video cameras.

Figure 1:
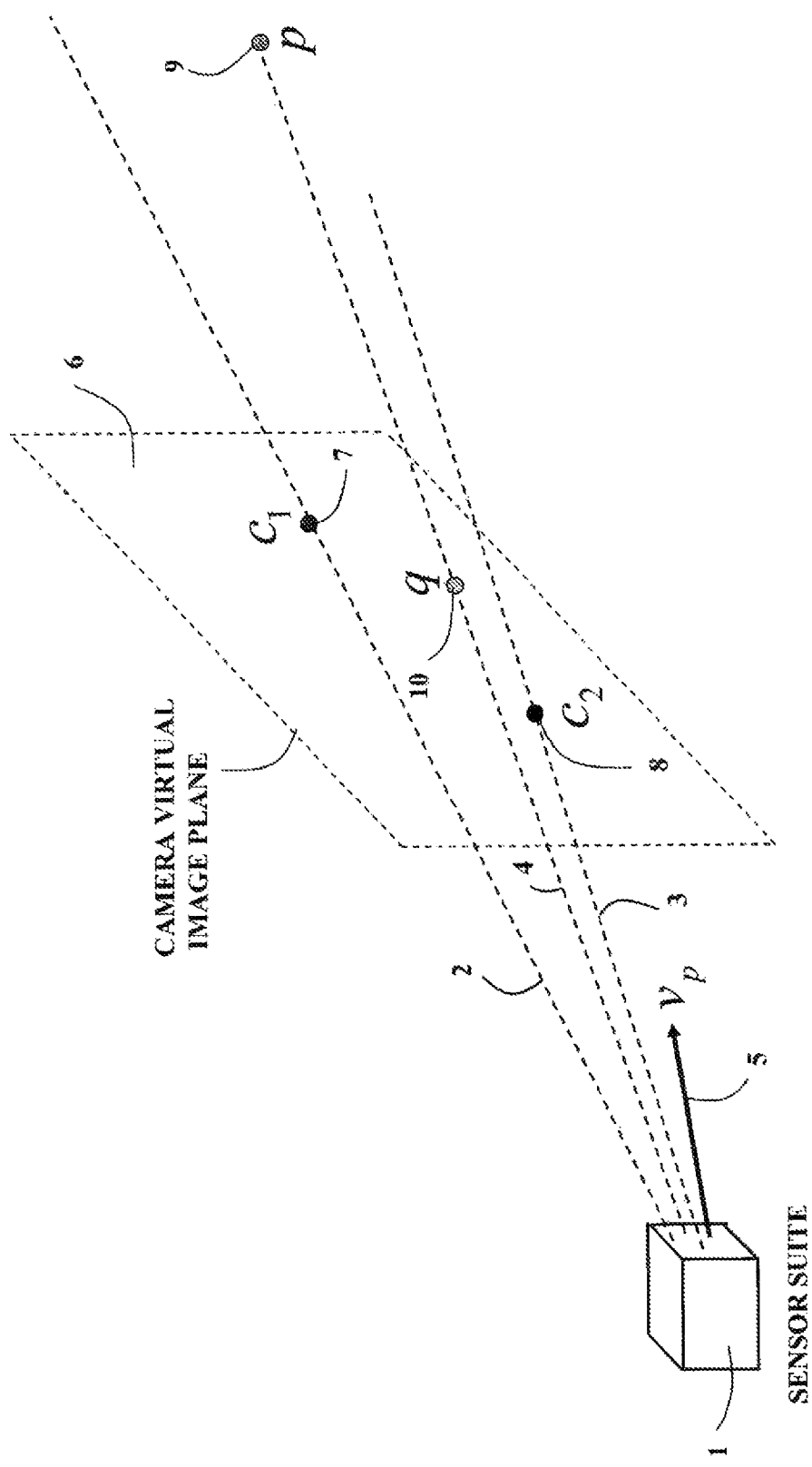
FIG. 1 illustrates a sensor system for 3D video Doppler radar (vidar) imaging.

A sensor system for 3D vidar imaging is shown in FIG. 1 where 1—the sensor system which may include a sensor suite or apparatus, 2—a first moving Doppler radar motion ray, 3—a second moving Doppler radar motion ray, 4—a radar direction ray connecting the sensor apparatus 1 to a scene point 9, 5—the sensor suite motion vector, 6—the camera virtual image plane of the video camera 14, 7—the intersection of the first Doppler radar motion ray 2 with the virtual image plane 6, 8—the intersection of the second Doppler radar motion ray 3 with the virtual image plane 6, and 9—a 3D scene point, and 10—the intersection of a direction ray connecting the sensor apparatus 1 and the 3D scene point 9 with the virtual image plane 6.

Figure 2:
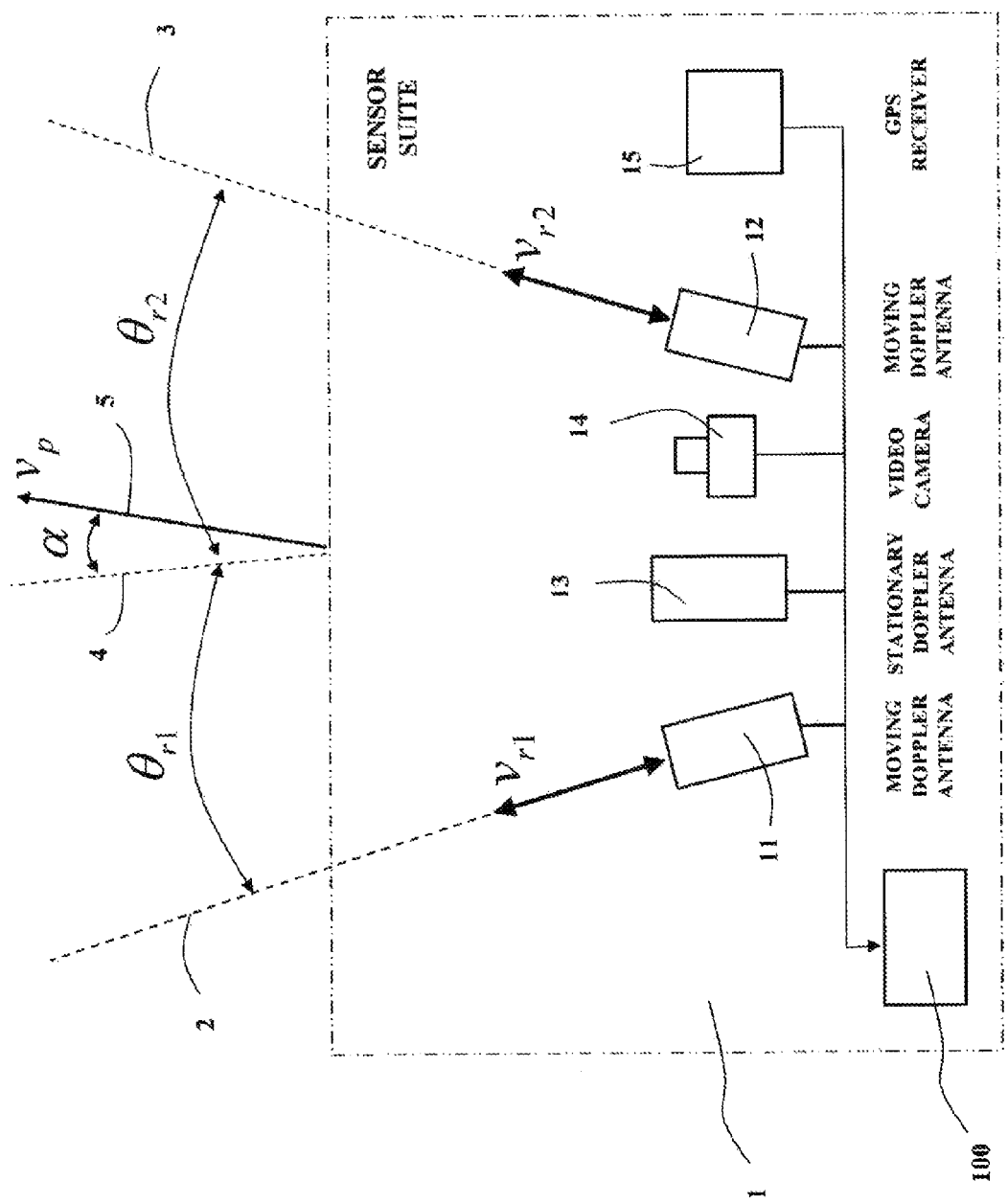
FIG. 2 illustrates the layout of the sensor system.
Figure 3:
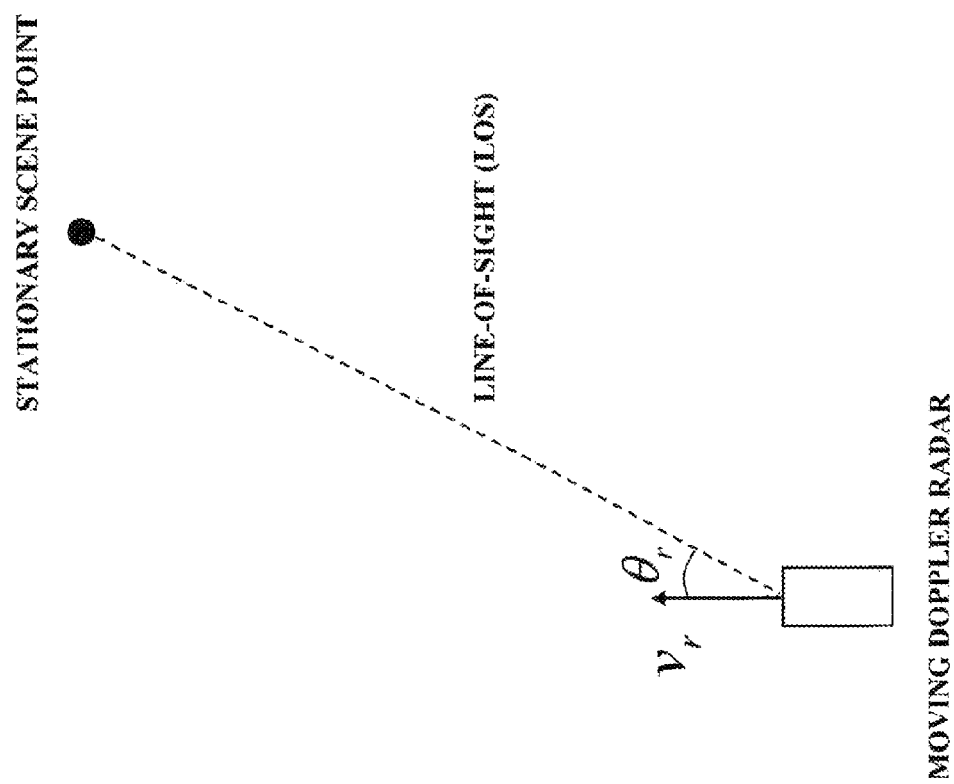
FIG. 3 illustrates the relative velocity of a stationary scene point.
Figure 4:
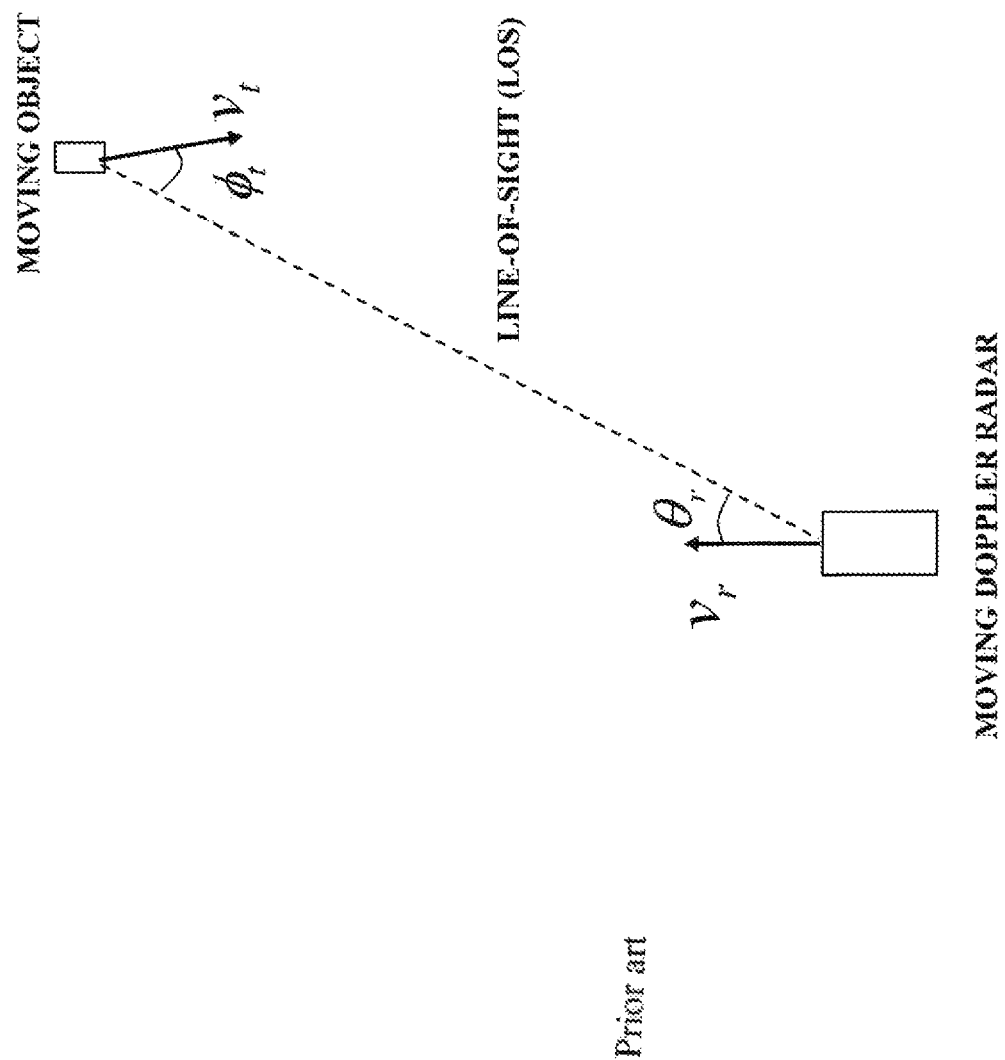
FIG. 4 illustrates the relative velocity measurement of an approaching moving object.
Figure 5:
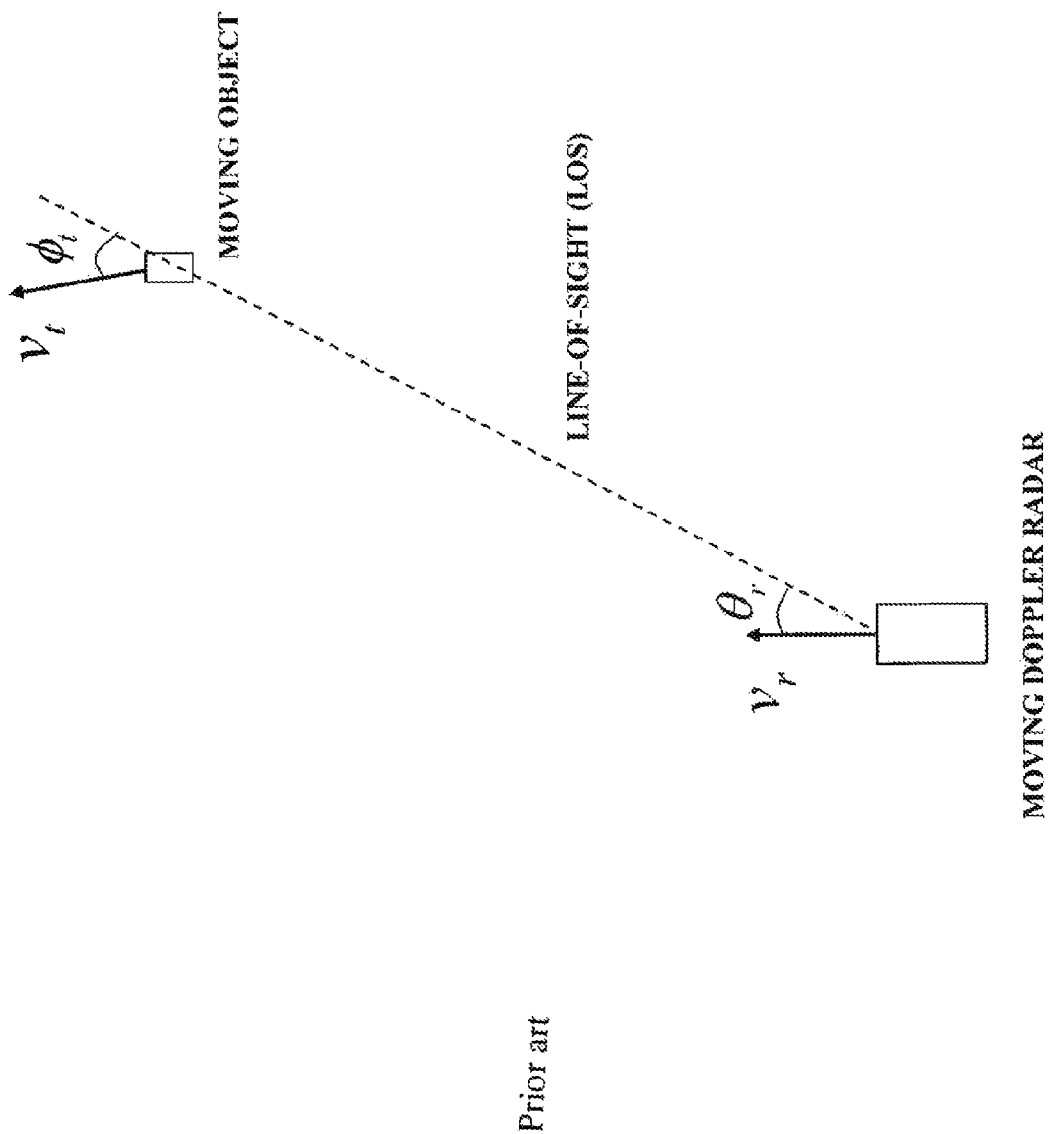
FIG. 5 illustrates the relative velocity measurement of a leaving moving object.

FIG. 2 shows the layout of the sensor apparatus 1 where 11—a first moving Doppler radar, 12—a second moving Doppler radar, 13—a fixed or stationary Doppler radar, 14—a fixed or stationary video camera, 15—a GPS receiver and 100—information computing device such as a computer, laptop, personal computer, PDA or other such device.

Figure 6:
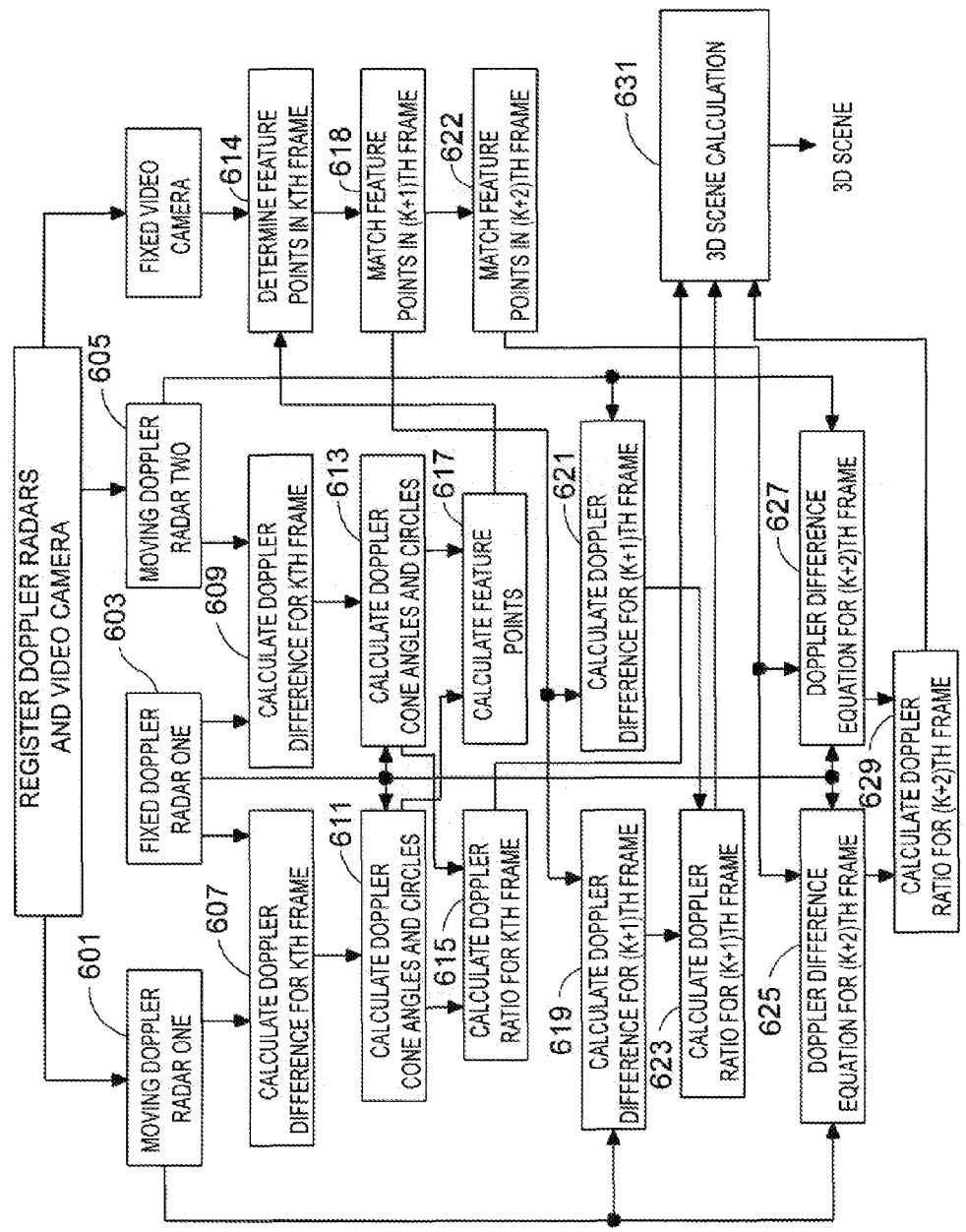
FIG. 6 illustrates the functional flow chart of the system.

The functional flow chart of the system is shown in FIG. 6. In the following, we will describe the functional blocks.

1. Register Doppler Radars and Video Camera

The first and second Doppler radars 11,12 in the sensor apparatus 1 may be extended or retracted or moved side to side as illustrated in steps 601, 605 by a motor (not shown) which may be a DC or stepper motor or other movement device and may be moved on sliding tracks (not shown). An optical encoder (not shown) may be mounted on the shaft of the motor, so the sliding speeds of the Doppler radars ($v_{r_1}$ and $v_{r_2}$ in FIG. 2) may be determined. The sliding track orientation angles ($\theta_{r_1}$ and $\theta_{r_2}$ in FIG. 2) are predetermined. Using a calibration method, the intersections ($C_1$ and $C_2$ in FIG. 1) of the first and second motion rays 2, 3 with the virtual image planes 6 are determined. Note, this registration method can be applied to a plurality of Doppler radars and cameras.

Figure 7:
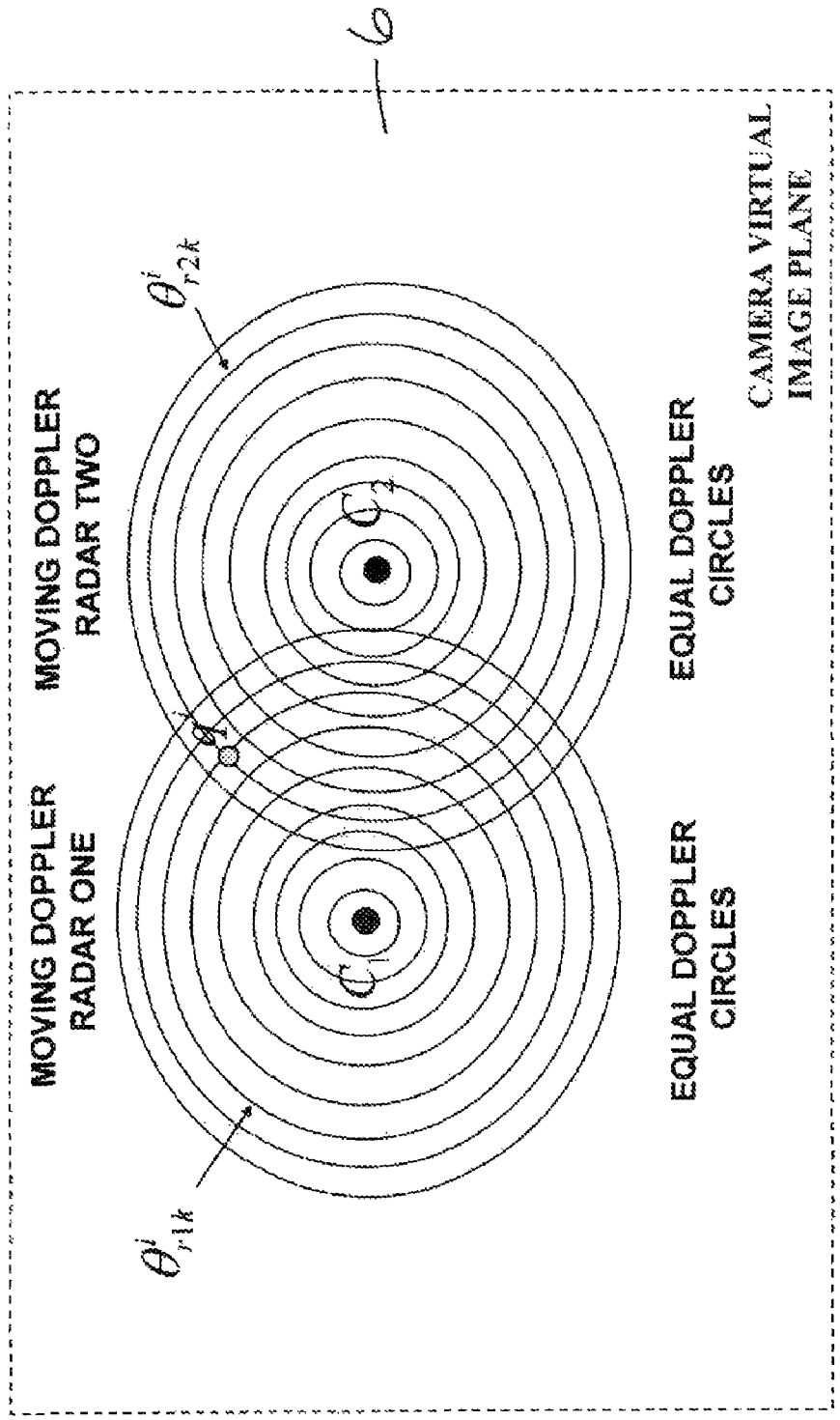
FIG. 7 illustrates the registration of the first and second moving Doppler radars with the video camera.

It can be seen in FIG. 7, showing the registration of the first and second moving Doppler radars 11,12 with the video camera 14, with the determination of $C_1$ and $C_2$ that the first and second moving Doppler radars 11, 12 may be substantially precisely registered with the video camera 14. The locations of substantially equal-Doppler cones of each of the radars 11, 12 may be determined on the camera's virtual image plane 6, so that the physical information from the scene 9 may be calculated from both Doppler and video signals from the first moving radar 11, the second moving radar 12, the stationary Doppler radar 13 and the video camera 14. The computing device 100 may accept inputs from the above described elements and may perform the following calculations.

2. Calculate Doppler Differences for k th Frame

Assume the current time is the time of the k th video image frame, i.e., t=k in step 607, 609. The Doppler frequencies of scene point $p^i$ induced by both moving Doppler radars may be given by $$f_{D_k}^{1,i} = K_1[v_{p_k}\cos(\alpha_k^i) + v_{r_k}\cos(\theta_{r_1}k^i)], i=1,\ldots,N \quad (4)$$

and $$f_{D_k}^{2,i} = K_2[v_{p_k}\cos(\alpha_k^i) + v_{r_k}\cos(\theta_{r_2}k^i)], i=1,\ldots,N \quad (5)$$

where N may be the number of scene points 9, $K_1$ and $K_2$ may be Doppler conversion constants for the first and second moving Doppler radar (11 and 12 in FIG. 2), and $\theta_{r_1k}^i$, $\theta_{r_2k}^i$, and $\alpha_k^i$ are depicted in FIG. 2 with an additional time index k and a scene point index i. A fixed Doppler radar 13 may be used to sense the platform motion $$f_{D_k}^{3,i} = K_3 v_{p_k}\cos(\alpha_k^i), i=1,\ldots,N \quad (6)$$

where $K_3$ is the Doppler conversion constant for the fixed Doppler radar (13 in FIG. 2). Since all three radars 11,12,13 may be located together and assuming that the distance from the sensor suite to point $p^i$ may be much larger than the distance between radars 11,12,13, the following Doppler differences may be $$\Delta f_{D_k}^{1,i} = \frac{f_{D_k}^{1,i}}{K_1} - \frac{f_{D_k}^{3,i}}{K_3} = v_{r_1k}\cos(\theta_{r_1k}^i), i=1,\ldots,N \quad (7)$$

and $$\Delta f_{D_k}^{2,i} = \frac{f_{D_k}^{2,i}}{K_2} - \frac{f_{D_k}^{3,i}}{K_3} = v_{r_2k}\cos(\theta_{r_2k}^i), i=1,\ldots,N \quad (8)$$

where the impact of the platform motion may have been removed. Eqs. (7) and (8) may actually recover the substantially independent motion Doppler signals of the first and second moving Doppler radars 11, 12, except for the conversion constants. The Doppler differences in Eqs. (7) and (8) are the ones for the first frame.

3. Calculate Doppler Cone Angles and Doppler Circles

From Eqs. (7) and (8), Doppler cone angles at t=k may be calculated as illustrated in steps 611, 613 as $$\theta_{r_1k}^i = \cos^{-1}\left(\frac{\Delta f_{D_k}^{1,i}}{v_{r_1k}}\right) \quad (9)$$

and $$\theta_{r_2k}^i = \cos^{-1}\left(\frac{\Delta f_{D_k}^{2,i}}{v_{r_2k}}\right). \quad (10)$$

Using Doppler cone angles in Eqs. (9) and (10), Doppler circles[1] may be constructed on the virtual image plane 6, as shown in FIG. 7). The intersection of the Doppler circles specified by $\theta_{r_1}k^i$ and $\theta_{r_2}k^i$ may be a feature point, $q^i$, as indicated in FIG. 7).

[1] Precisely speaking, these may be ellipses. Due to a small angle between radar motion vectors, the ellipses may be well approximated as circles.

4. Calculate Doppler Ratio for the k th Frame

In step numerals 615, 617, let the moving Doppler radar motion vectors be $$\underline{v}_{r_1k} = [n_{x1_k}, n_{y1_k}, n_{z1_k}], \underline{v}_{r_2k} = [n_{x2_k}, n_{y2_k}, n_{z2_k}] \quad (11)$$

which are known from the calibration. Assume the locations of the sensor apparatus 1 may be known from the on-board GPS 15: $\underline{S}_k = [x_s, y_s, z_s]_k$. The vector from the location of sensor apparatus 1 $\underline{S}_k$ to point $p^i = [x_i, y_i, z_i]$ may be $$\underline{V}_{Sp_k}^i = [x_i - x_{s_k}, y_i - y_{s_k}, z_i - z_{s_k}] \quad (12)$$

and the angles, $\theta_{r_1}k^i$ and $\theta_{r_2}k^i$ and may be defined by $$\theta_{r_1k}^i = \cos^{-1}\frac{\underline{V}_{Sp_k}^i \cdot \underline{v}_{r_1k}}{\|\underline{V}_{Sp_k}^i\|\|\underline{v}_{r_1k}\|} \quad (13)$$

and $$\theta_{r-2k}^i = \cos^{-1}\frac{\underline{V}_{Sp_k}^i \cdot \underline{v}_{r_2k}}{\|\underline{V}_{Sp_k}^i\|\|\underline{v}_{r_2k}\|}. \quad (14)$$

Substituting Eqs. (13) and (14) into Eqs. (7) and (8) gives $$\Delta f_{D_k}^{1,i} = \frac{\underline{V}_{Sp_k}^i \cdot \underline{v}_{r_1k}}{\|\underline{V}_{Sp_k}^i\|} = \quad (15)$$

$$\frac{n_{x1_k}(x_i - x_{s_k}) + n_{y1_k}(y_i - y_{s_k}) + n_{z1_k}(z_i - z_{s_k})}{\sqrt{(x_i - x_{s_k})^2 + (y_i - y_{s_k})^2 + (z_i - z_{s_k})^2}} \quad (16)$$

and $$\Delta f_{D_k}^{2,i} = \frac{\underline{V}_{Sp_k}^i \cdot \underline{v}_{r_2k}}{\|\underline{V}_{Sp_k}^i\|} = \quad (17)$$

$$\frac{n_{x2_k}(x_i - x_{s_k}) + n_{y2_k}(y_i - y_{s_k}) + n_{z2_k}(z_i - z_{s_k})}{\sqrt{(x_i - x_{s_k})^2 + (y_i - y_{s_k})^2 + (z_i - z_{s_k})^2}}. \quad (18)$$

A Doppler difference ratio at t=k may be derived as $$\frac{\Delta f_{D_k}^{1,i}}{\Delta f_{D_k}^{2,i}} = \frac{n_{x1_k}(x_i - x_{s_k}) + n_{y1_k}(y_i - y_{s_k}) + n_{z1_k}(z_i - z_{s_k})}{n_{x2_k}(x_i - x_{s_k}) + n_{y2_k}(y_i - y_{s_k}) + n_{z2_k}(z_i - z_{s_k})} \quad (19)$$

which may be a 3D line passing through scene point $p^i$. Three 3D lines intersecting at a same point are needed to uniquely determine a 3D point.

5. Calculate Doppler Difference and Ratio for (k+1)th Frame

Now in steps 619, 621, 623 the sensor apparatus 1 moves to a new position $S_{k+1}$ and takes an image at t=k+1. Point $q_k^i$, as determined in step 614, becomes $q_{k+1}^i$ and the correspondence is established by a feature matching operator in step 618. Let $\underline{q}_{k+1}^i = [u_{k-1}^i, v_{k+1}^i]$. The Doppler angles passing $\underline{q}_{k+1}^i$ are determined as $$\theta_{k+1}^{1,i} = \cos^{-1}\frac{V_{q_{k+1}}^i \cdot v_{r1_{k+1}}}{\|V_{q_{k+1}}^i\|\|v_{r1_{k+1}}\|} \quad (20)$$

$$= \cos^{-1}\frac{n_{x1_{k+1}} u_{k+1}^i + n_{y1_{k+1}} v_{k+1}^i + n_{z1_{k+1}} f}{\sqrt{(u_{k+1}^i)^2 + (v_{k+1}^i)^2 + f^2}}$$

and $$\theta_{k+1}^{2,i} = \cos^{-1}\frac{V_{q_{k+1}}^i \cdot v_{r2_{k+1}}}{\|V_{q_{k+1}}^i\|\|v_{r2_{k+1}}\|} \quad (21)$$

$$= \cos^{-1}\frac{n_{x2_{k+1}} u_{k+1}^i + n_{y2_{k+1}} v_{k+1}^i + n_{z2_{k+1}} f}{\sqrt{(u_{k+1}^i)^2 + (v_{k+1}^i)^2 + f^2}}$$

where f is the camera focus length and $V_{q_{k+1}}^i = [u_{k+1}^i, v_{k+1}^i, f]^T$ is the vector pointing from $S_{k+1}$ (the origin of camera coordinate) through $\underline{q}_{k+1}^i$ and to $\underline{p}^i$. Then, we have $$\Delta f_{D_{k+1}}^{1,i} = v_{r_{k+1}} \cos(\theta_{k+1}^{Ka1,i}) \quad (22)$$

$$= \frac{v_{r_{k+1}}\left[\begin{array}{c} n_{x1_{k+1}}(x_i - x_{s_{k+1}}) + n_{y1_{k+1}}(y_i - y_{s_{k+1}}) + \\ n_{z1_{k+1}}(z_i - z_{s_{k+1}}) \end{array}\right]}{\sqrt{(x_i - x_{s_{k+1}})^2 + (y_i - y_{s_{k+1}})^2 + (z_i - z_{s_{k+1}})^2}}$$

and $$\Delta f_{D_{k+1}}^{2,i} = v_{r_{k+1}} \cos(\theta_{k+1}^{Ka2,i}) \quad (23)$$

$$= \frac{v_{r_{k+1}}\left[\begin{array}{c} n_{x2_{k+1}}(x_i - x_{s_{k+1}}) + n_{y2_{k+1}}(y_i - y_{s_{k+1}}) + \\ n_{z2_{k+1}}(z_i - z_{s_{k+1}}) \end{array}\right]}{\sqrt{(x_i - x_{s_{k+1}})^2 + (y_i - y_{s_{k+1}})^2 + (z_i - z_{s_{k+1}})^2}}.$$

The second 3D line equation may also be derived as $$\frac{\Delta f_{D_{k+1}}^{1,i}}{\Delta f_{D_{k+1}}^{2,i}} = \frac{n_{x1_{k+1}}(x_i - x_{s_{k+1}}) + n_{y1_{k+1}}(y_i - y_{s_{k+1}}) + n_{z1_{k+1}}(z_i - z_{s_{k+1}})}{n_{x2_{k+1}}(x_i - x_{s_{k+1}}) + n_{y2_{k+1}}(y_i - y_{s_{k+1}}) + n_{z2_{k+1}}(z_i - z_{s_{k+1}})}. \quad (24)$$

6. Calculate Doppler Difference and Ratio for (k+2)th Frame

Repeating procedure in steps 622, 625, 627, 629 of section 5 at t=k+2, we will obtain the third 3D line equation as $$\frac{\Delta f_{D_{k+2}}^{1,i}}{\Delta f_{D_{k+2}}^{2,i}} = \frac{n_{x1_{k+2}}(x_i - x_{s_{k+2}}) + n_{y1_{k+2}}(y_i - y_{s_{k+2}}) + n_{z1_{k+2}}(z_i - z_{s_{k+2}})}{n_{x2_{k+2}}(x_i - x_{s_{k+2}}) + n_{y2_{k+2}}(y_i - y_{s_{k+2}}) + n_{z2_{k+2}}(z_i - z_{s_{k+2}})}. \quad (25)$$

7. 3D Scene Calculation

Solving Eqs. (19), (24) and (25) gives us 3D information of scene point $p^i$ in step 631. A collection of 3D scene point 9 may comprise the 3D scene. The above process may be repeated any number of times.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. An imaging system to generate an image of a scene, comprising:
   a first movable radar to generate a first radar motion ray;
   a second movable radar to generate a second radar motion ray;
   a third fixed radar to generate a third radar direction ray;
   a stationary video camera to receive data from the intersection of the first radar motion ray and the second radar motion ray,
   wherein said first radar motion ray and said second radar motion ray move with respect to the stationary video camera.

2. An imaging system to generate an image of a scene as in claim 1, wherein the second radar is a second Doppler radar.

3. An imaging system to generate an image of a scene as in claim 1, wherein the third fixed radar is a third Doppler radar.

4. An imaging system to generate an image of a scene as in claim 1, wherein the image system includes a sensor apparatus including a global positioning system receiver.

5. An imaging system to generate an image of a scene, comprising:
   a first movable radar to generate a first radar motion ray;
   a second movable radar to generate a second radar motion ray;
   a third fixed radar to generate a third radar direction ray;
   a stationary video camera to receive data from the intersection of the first radar motion ray and the second radar motion ray, wherein the imaging system generates a first Doppler difference based upon the difference between the first radar motion ray and the third radar direction ray.

6. An imaging system to generate an image of a scene as in claim 5, wherein the imaging system generates a second Doppler difference based upon the difference between the second radar motion ray and the third radar direction ray.

7. An imaging system to generate an image of a scene as in claim 6, wherein the imaging system generates a second cone angle and a second circle based upon the second Doppler difference.

8. An imaging system to generate an image of a scene as in claim 7, wherein the imaging system generates a feature point based upon the first and second cone angles and the first and second circles.

9. An imaging system to generate an image of a scene as in claim 5, wherein the imaging system generates a first cone angle and a first circle based upon the first Doppler difference.

10. An imaging system to generate an image of a scene as in claim 9, wherein the imaging system generates a Doppler ratio based upon the first and second Doppler differences.

11. An imaging system to generate an image of a scene, comprising:
    a first movable radar to generate a first radar motion ray;
    a second movable radar to generate a second radar motion ray;
    a third fixed radar to generate a third radar direction ray;
    a stationary video camera to receive data from the intersection of the first radar motion ray and the second radar motion ray, wherein the imaging system generates a first Doppler difference based upon the difference between the first radar motion ray and the third radar direction ray, a second Doppler difference based upon the difference between the second radar motion ray and the third radar direction ray, generates a Doppler ratio based upon the first and second Doppler differences, a first cone angle and a first circle based upon the first Doppler difference, a second cone angle and a second circle based upon the second Doppler difference, and generates a feature point based upon the first and second cone angles and the first and second circles.

12. An imaging system to generate an image of a scene as in claim 11, wherein the imaging system generates a 3D line equation at each frame.

13. An imaging system to generate an image of a scene as in claim 11, wherein the imaging system generates a 3D scene point from three 3D lines.

14. An imaging system to generate an image of a scene, comprising:
 a first movable radar to generate a first radar motion ray;
 a second movable radar to generate a second radar motion ray;
 a third fixed radar to generate a third radar direction ray;
 a stationary video camera to receive data from the intersection of the first radar motion ray and the second radar motion ray, wherein the first radar is a first Doppler radar.

15. An imaging system adapted for registration, comprising:
 a first movable radar to generate a first radar motion ray;
 a second movable radar to generate a second radar motion ray;
 a third fixed radar to generate a third radar direction ray;
 a stationary video camera to define an virtual image plane, wherein the first radar motion ray and the second radar motion ray register with the virtual image plane of the video camera,
 wherein the first radar motion ray and the second radar motion ray moves with respect to the stationary video camera.

16. An imaging system adapted for registration as in claim 15, wherein the first movable radar is a first movable Doppler radar.

17. An imaging system adapted for registration as in claim 15, wherein the second movable radar is a second movable Doppler radar.

18. An imaging system adapted for registration as in claim 15, wherein the third fixed radar is a third fixed Doppler radar.

* * * * *